(12) United States Patent
Lu et al.

(10) Patent No.: US 6,947,129 B1
(45) Date of Patent: Sep. 20, 2005

(54) METHOD AND APPARATUS FOR MEASURING POLARIZATION-MODE DISPERSION

(75) Inventors: Zhenguo Lu, Ottawa (CA); Fengguo Sun, Ottawa (CA); GaoZhi Xiao, Ottawa (CA); Chander P. Grover, Ottawa (CA)

(73) Assignee: National Research Council of Canada, Ottawa (CA)

( * ) Notice: Subject to any disclaimer, the term of this patent is extended or adjusted under 35 U.S.C. 154(b) by 0 days.

(21) Appl. No.: 10/842,495

(22) Filed: May 11, 2004

(51) Int. Cl.$^7$ ............................................. G01N 21/00
(52) U.S. Cl. ..................................................... 356/73.1
(58) Field of Search ...................... 356/73.1, 450–456; 385/15, 122, 31, 137, 123, 126

(56) References Cited

U.S. PATENT DOCUMENTS 6,522,818 B1 * 2/2003 Aso et al. .................... 385/122
6,687,426 B1 * 2/2004 May et al. ..................... 385/15
6,819,428 B2 * 11/2004 Ogawa .......................... 356/450

* cited by examiner

Primary Examiner—Tu T. Nguyen
(74) Attorney, Agent, or Firm—George A. Seaby

(57) ABSTRACT

Polarization-mode dispersion (PMD) of an optical device, i.e. fiber or component is effected by launching a first pump laser beam of a fixed wavelength, a probe laser beam with a second fixed wavelength and a second pump laser beam having a variable wavelength and a polarization direction orthogonal to the other two beams into an optical device to generate three output signals which are input into a semiconductor optical amplifier to generate four-wave mixing (FWM) products. The average PMD of the device is computed by measuring the power of the FWM products versus the wavelength of the second pump laser beam.

10 Claims, 4 Drawing Sheets

METHOD AND APPARATUS FOR MEASURING POLARIZATION-MODE DISPERSION

BACKGROUND OF THE INVENTION

1. Field of the Invention

This invention relates to a method and apparatus for measuring polarization-mode dispersion in optical devices such as optical fibers or components.

2. Discussion of the Prior Art

Polarization-mode dipersion (PMD) is a fundamental property of optical fiber and components by which any lightwave signal is split into two polarization modes that travel at different speeds on the basis of polarization state. The two polarization modes experience a difference in propagation time known as differential group delay (DGD). The PMD of an optical fiber or component is simply the average DGD. Existing PMD, measuring techniques [see, for example Y. Namihira et al, Electron Lett., 1992, 28, No. 25, 2265–2266 (1992) and A. Galtarossa et al, J. of Lighwave Technol., 14, 42–42 (1996)] utilize the fixed-analyzer method, the Jones-matrix method, and the Poincare-sphere method. A major limitation of these methods is that any motion of the measuring apparatus, especially at the end of fibers, can totally destroy the measured results. Maintaining a motionless condition is often difficult, especially with field measurements. One motionless dispersion measuring technique based on measuring four-wave mixing (FWM) products in a low-dispersion, low PMD measurement fiber has been proposed [see S. Song et al, J. of Lightwave Technol., 17, 2530–2533 (1999)]. The polarization-mode dispersion measurement accuracy of this technique is limited by an additional PMD added by the measuring fiber itself, which is used to generate four-wave mixing signals. Moreover, the PMD measurement accuracy of the method is also limited by the wavelength tuning range of the variable signal because the four-wave conversion efficiency drops rapidly with wavelength detuning, causing a reduction in the intensity of the FWM signal and a degradation in the optical signal-to-noise ratio (OSNR).

GENERAL DESCRIPTION OF THE INVENTION

The object of the present invention is to provide a method and apparatus for determining polarization-mode dispersion in optical devices which are insensitive to mechanical vibration and instability in the test equipment or apparatus, and which significantly reduce the cost and time of PMD testing in the running of dense wavelength-division multiplexed (DWDM) networking systems.

Thus, according to one aspect, the invention relates to a method of determining the polarization-mode dispersion in an optical device comprising the steps of:

generating a first pump laser beam with a fixed wavelength;

generating a probe laser beam with a second fixed wavelength and the same input polarization direction as said first pump laser beam;

generating a second pump laser beam having a variable wavelength and a polarization direction orthogonal to the first pump laser beam and the probe laser beam;

launching the first and second pump laser beams and said probe laser beam into an optical device to generate three output signals;

inputting the three output signals into a semiconductor optical amplifier (SOA) to generate four-wave mixing products dependent upon the polarization-mode dispersion of the device; and computing the average polarization-mode dispersion of the device by measuring the power of the four-wave mixing products versus the wavelength of the second pump laser beam.

According to another aspect, the invention relates to an apparatus for determining the polarization-mode dispersion in an optical device comprising:

first laser means for generating a first pump laser beam with a fixed wavelength;

second, probe laser means for generating a probe laser beam with a second fixed wavelength and the same input polarization direction as said first pump laser beam;

third laser means for generating a second pump laser beam having a variable wavelength and a polarization direction orthogonal to the first pump laser beam and the probe laser beam;

polarization beam splitter means for receiving said first pump, said probe and said second pump beam, and relaying said beams through an optical device under test to generate three output signals;

semiconductor optical amplifier means for receiving said output signals and generating four-wave mixing products dependent upon the polarization-mode dispersion of the device; and analyzer means for computing the polarization-mode dispersion of the device under test by measuring the power of the four-wave mixing products versus the wavelength of the second pump laser beam.

The above defined method is insensitive to mechanical vibrations and instabilities in the apparatus, because the polarization-mode dispersion measured by the apparatus depends only on the related states of polarization (SOP) change between the second pump laser beam and the first pump laser beam or the probe laser beam in the device under test (DUT), and not the position coordinates of the device or the apparatus.

BRIEF DESCRIPTION OF THE DRAWINGS

The invention is described below in greater detail with reference to the accompanying drawings, wherein.

DESCRIPTION OF THE PREFERRED EMBODIMENT

Figure 1:
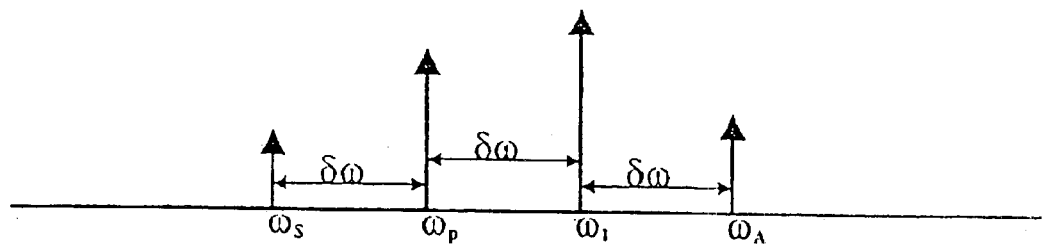
FIG. 1 is a block diagram showing the spectrum of the traditional four-wave mixing process in a semiconductor optical amplifier based on using two co-polarized laser beams.
Figure 2:
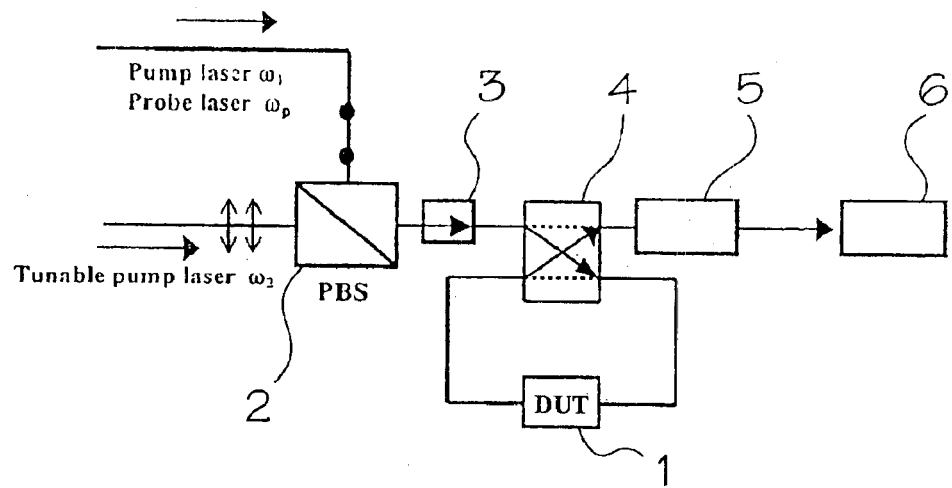
FIG. 2 is a block diagram showing a polarization-mode dispersion measurement setup using a broad-band orthogonal-pumps four-wave mixing technique in a semiconductor optical amplifier according to an embodiment of the present invention.

In a nonlinear optical material, wave-mixing arises from a nonlinear optical response when more than one wave (signal and pump) is present. The outcome of this effect is generation of another wave with an amplitude proportional to the product of the signal and the pump amplitudes. The phase and the frequency of the generated waves are the sum and difference of those of the interacting waves. FIG. 1 shows a traditional schematic of an optical spectrum generated by four-wave mixing in a semiconductor optical amplifier based on using two co-polarized laser beams. In this scheme the amplitude and the optical signal-to-noise ratio of the FWM products decrease quickly with increasing frequency shift between the pump and the probe signal frequencies [see A. Uskov et al, IEEE J. Quantum Electron 30, 1769–1781 (1994)]. In this case, there is described a broad-band orthogonal-pump (BOP) scheme based on using two orthogonally polarized pumps which give constant amplitude and optical signal-to-noise ratio of the FWM products over a large range of frequency shifts [see M. W. K. Mark et al, IEEE Photon Technol. Lett., 10, 1401–1403 (1998)], which will significantly enhance the accuracy of the dispersion measurement in comparison with the current existing technology. FIG. 2 shows the configuration of the broad band orthogonal pump scheme for measuring the polarization-mode dispersion in a device such as an optical fiber or component. The optical frequency difference $\delta\omega$ between the first pump laser beam $\omega_1$ (optical power $P_1$) and the probe input beam $\omega_P$ (optical power $P_P$) is fixed. The optical frequency difference $\delta\omega_2$ between the first laser pump beam $\omega_1$ and the second pump laser beam $\omega_2$ can be changed. The first pump laser beam $\omega_1$ and the probe beam $\omega_P$ have the same state of polarization (SOP) and the second pump beam $\omega_2$ is polarized orthogonally to their SOP.

Figure 3:
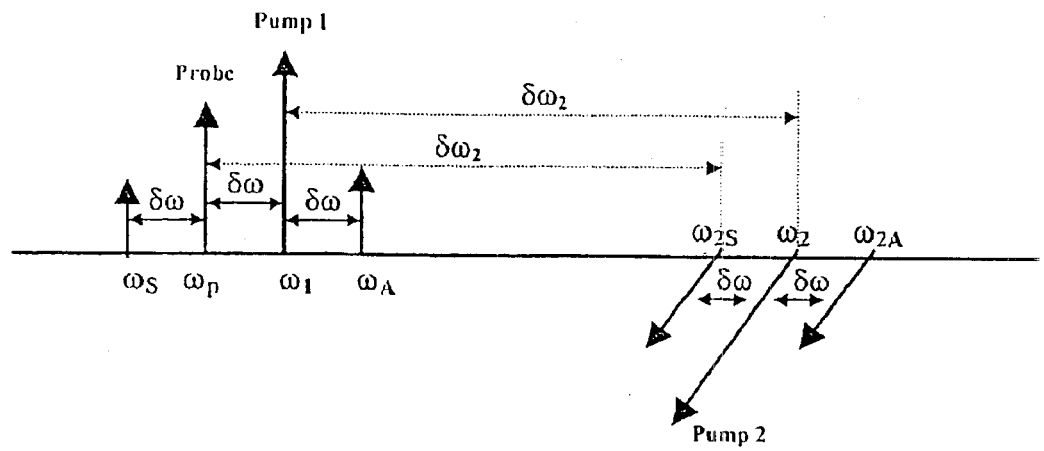
FIG. 3 is a block diagram showing the spectrum of the broad-band orthogonal-pumps four-wave mixing process used in the present invention.

FIG. 3 shows an optical spectrum at the output of the amplifier for four-wave mixing using the broad-band orthogonal pump scheme. The FWM output beam of interest is $\omega_{2S}$, which is a replica of the input probe beam $\omega_P$ shifted in frequency by $\delta\omega_2$. To understand the intensity of the wave $\omega_{2S}$, we can use a simple lumped model for FWM in semiconductor optical amplifiers, in which the amplifier is regarded as a lumped element providing saturable gain followed by third-order nonlinearity and amplified spontaneous emission noise [see J. P. R. Lacey et al, J. Lightwave Technol. 16, 2419–2427, (1998)]. The three input beams undergo four-wave mixing in the gain medium of the amplifier and produce wave-mixed signals at several wavelengths. The FWM optical field at frequency $\omega_{2S}$ satisfies the equation:

$$\omega_{2S}=\omega_2-(\omega_1-\omega_P) \tag{1}$$

and the corresponding field $E_{2S}$ is given by $$E_{2S}=E_2(E_1 \cdot E_P)Y_{P1}(\omega_P-\omega_1)\exp\{i[(\omega_P-\omega_1+\omega_2)t+\phi_P-\phi_1+\phi_2]\}$$

$$+E_P(E_1 \cdot E_2)Y_{21}(\omega_2-\omega_1)\exp\{i[(\omega_2-\omega_1+\omega_P)t+\phi_2-\phi_1+\phi_P]\} \tag{2}$$

So, $$E_{2S}=E_2(E_1 \cdot E_P)Y_{P1}(\omega_P-\omega_1)\exp[i(\omega_{2S}t+\Delta\phi)]$$

$$+E_P(E_1 \cdot E_2)Y_{21}(\omega_2-\omega_1)\exp[i(\omega_{2S}t+\Delta\phi)] \tag{3}$$

where $\omega_1$, $\omega_2$, $\omega_P$, $\omega_{2S}$, $E_1$, $E_2$, $E_P$, and $E_{2S}$ are the frequencies and the field amplitudes of the first pump laser beam, the second pump laser beam, the input probe beam, and the FWM signal of interest, respectively.
$\Delta\phi=\phi_P-\phi_1+\phi_2$ is the phase difference between the interacting waves. The complex coupling coefficient $Y_{P1}(\omega_P-\omega_1)$ is produced by the same carrier grating as in conventional FWM and decreases rapidly as $|\omega_P-\omega_1|$ increases [see A. Uskov et al, supra].

When a photo detector is used to measure optical output, the power at $\omega_{2S}$ is given by $$P_{2S}=|E_2|^2|E_1 \cdot E_P|^2|Y_{P1}(\omega_P-\omega_1)|^2+|E_P|^2|E_1 \cdot E_2|^2|Y_{21}(\omega_2-\omega_1)|^2 \tag{4}$$

since in the inventors' experiments $\omega_1-\omega_P=\delta\omega$ is fixed and the input polarization of these two beams are parallel, the first term in the above equation gives a background as $\omega_2$ varying. The second term will fluctuate due to the existence of the polarization-mode dispersion of the device under test. The contribution of this term can be written as $$P_{2S}(SOP_2,SOP_1)=\tfrac{1}{2}|E_P|^2|Y_{21}(\omega_2-\omega_1)|^2[1+\bar{s}_2 \cdot \bar{s}_1] \tag{5}$$

where $\bar{s}_1=[s_1^{(1)} s_2^{(1)} s_3^{(1)}]^T$ and $\bar{s}_2=[s_1^{(2)} s_2^{(2)} s_3^{(2)}]^T$ are the two vectors of the first pump beam $\omega_1$ (or the probe $\omega_P$) and the second pump beam $\omega_2$ representing the polarization states of the input signals on the Poincare sphere.

To see how FWM power $P_{2S}$ generated in a semiconductor optical amplifier can be used to measure the polarization-mode dispersion in an arbitrary test fiber, it should first be noted that, according to the fixed polarizer method [see Craig D. Poole et al, Journal of Lightwave Technol. 12, 917 (1994)], the first order PMD of a fiber can be measured by launching a fixed state of polarization beam into the test fiber and then passing the output through a fixed polarizer. The output power from the polarizer is given by the expression, $$T=\tfrac{1}{2}[1+\bar{s}(\omega) \cdot \bar{P}] \tag{6}$$

where $\bar{s}(\omega)$ is the SOP of the light incident on the polarization analyzer and $\bar{P}$ is the unit vector specifying the transmission state (i.e. the pass axis of the polarization analyzer). First order polarization-mode dispersion is then estimated using the formula $$\langle \Delta T \rangle = K\Pi\frac{\langle N_e \rangle}{\Delta\omega} \tag{7}$$

where $<\Delta T>$ is the mean PMD, $<N_e>$ is the mean number of maxima and minima of the T curve in the frequency band $\Delta\omega$, and K is the polarization coupling factor.

Comparing equation (5) with equation (6), it is seen that they are the same function, except that the polarization state of the first pump laser beam $\omega_1$ with the fixed frequency in (5) replaces the polarizer transmission state $\bar{P}$ in (6). This suggests that an alternative to the fixed polarizer method would be to launch two fixed-states of polarization signals into the test fiber and pass the output through a semiconductor optical amplifier. According to (5), the four-wave mixing power generated in a SOA will vary with frequency changes of the test signal exactly as would be the output of the test signal alone passing through a fixed polarizer. This means that the four-wave mixing transfer function (5) can be used in place of the T function (6) when calculating the first order PMD using (7). The advantage of calculating PMD using the four-wave mixing power produced in a semiconductor optical amplifier is that no special care need be taken to maintain a strict spatial orientation between the test fiber and the measurement equipment (such as a polarizer). This is because the probe wave follows the signal wave through both the test and the amplifier and, therefore, automatically establishes the polarization reference in the amplifier.

Referring again to FIG. 1, when the pump laser beams $\omega_1$ and the probe laser beams $\omega_P$ have been input via a polarization beam splitter 2, an isolator 3 and a 2×2 switch 4 through a device 1 under test to a nonlinear optical material such as a semiconductor optical amplifier, FWM signals $\omega_S$ and $\omega_A$ are created at the end output of the SOA.

The four-wave mixing signals exiting the SOA 5 are fed to an optical spectral analyzer 6. The amplitude and the optical signal-to-noise ratio of the FWM signals decrease quickly with increasing frequency shift $\delta\omega$ between the pump and the probe signal frequencies. Thus, using the four-wave mixing scheme in FIG. 1, the frequency shift $\delta\omega$ is limited to the very small range. To overcome this problem, we have made use of a broad-band orthogonal-pump (BOP) scheme based on using two orthogonally polarized pumps that gives constant amplitude and optical signal-to-noise ratio of the. four-wave mixing products to achieve a large range of frequency shifts, which will significantly enhance the accuracy of the PMD measurement compared with current existing technology.

FIG. 2 shows the configuration of the broad-band orthogonal pump apparatus for measuring the PMD in a device 1 such as an optical fiber or component. The optical frequency difference $\delta\omega$ between the first pump laser beam $\omega_1$ (optical power $P_1$) and the probe input beam $\omega_P$ (optical power $P_P$) is fixed. The optical frequency difference $\delta\omega_2$ between the first pump beam $\omega_1$ and the second pump beam $\omega_2$ can be changed. The first pump beam $\omega_1$ and the probe beam $\omega_P$ have the same states of polarization and the second pump beam $\omega_2$ is polarized orthogonally to their SOP.

FIG. 3 shows an optical spectrum at the output of the SOA for four-wave mixing using the BOP scheme. The FWM output beam of interest is $\omega_{2S}$, which is a replica of the input probe beam $\omega_P$, shifted in frequency by $\delta\omega_2$. Based on the schemes of FIG. 2 and FIG. 3, the amplitude and the OSNR of the beam $\omega_{2S}$ are much more less insensitive on the frequency shift $\delta\omega_2$ [see Z. G. Lu et al, The Proceedings of the Third Canadian Conference on Broadband Research, 3, 238–249 (1999)].

Figure 4:
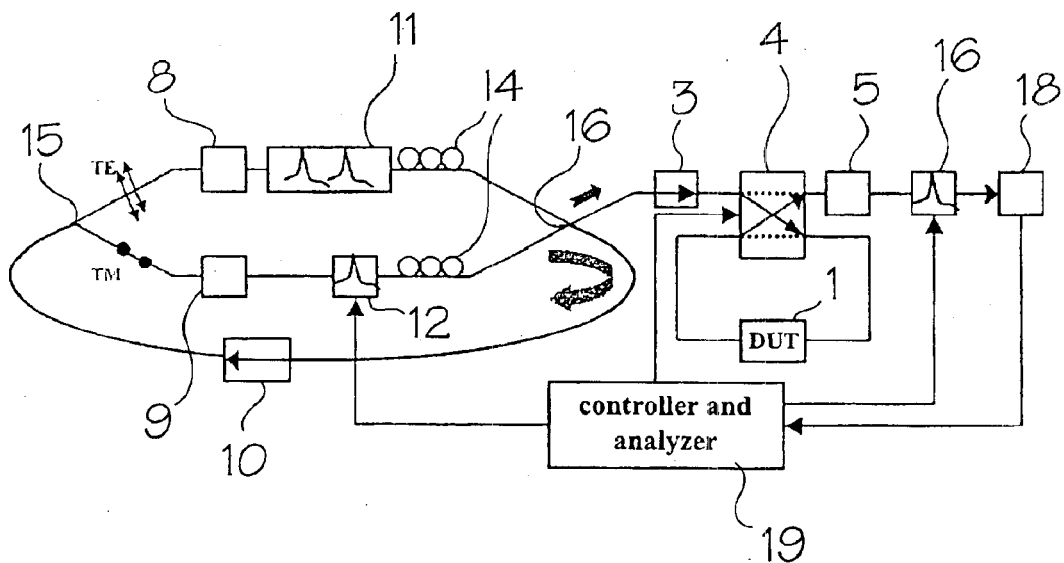
FIG. 4 is a block diagram showing a polarization-mode dispersion measuring apparatus in accordance with the present invention.

Based on our above, the inventors have produced the apparatus shown in FIG. 4, which can be used for measuring PMD in the optical fibers or components by using a BOP-FWM technique in a semiconductor optical amplifier. In this apparatus, the cavity consists of two interconnecting fiber rings. Two 1.55-$\mu$m commercial semiconductor optical amplifiers 8 and 9 are biased at a certain interjection current and are placed in the two rings. The typical fiber-to-fiber small signal gain of the amplifiers 8 and 9 is about 10 dB with the 10-dBm saturation output power. The TE/TM differential gain of the amplifiers 8 and 9 is less than 0.5 dB. To ensure unidirectional operation and to prevent back reflections, a polarization-independent optical isolator 10 is employed at the intersection of the two rings. A dual-wavelength filter 11 and a tunable filter 12 are used in combination with the amplifiers 8 and 9, polarization controllers 14, isolator 10 and the beam splitters 15 to created the three different lasing beams to act as the first pump laser beam $\omega_1$, the probe laser beam $\omega_P$ and the second pump laser beam $\omega_2$, respectively, in the BOP-FWM apparatus. A polarization beam splitter 15 was used to ensure that both the pump laser beam $\omega_1$ and the probe signal beam $\omega_P$ have the same state of polarization and the second pump laser pump $\omega_2$ is polarized orthogonally to their SOP. The ring laser output is obtained from a 3-dB beam coupler 16. The three laser beams have gone through the isolator 3 and the 2×2 optical switch 4 before they are launched into the semiconductor optical amplifier 5 to generate four-wave mixing signals. If the three laser beams go through the device under test 1 such as optical fibers or components, the FWM signal intensities will depend on the polarization mode dispersion of the DUT. In the proposed measurement set-up, a high-speed 2×2 optical switch 4 can be used to obtain the interested four-wave mixing signal intensity in the following two situations: with DUT and without such device. Then the frequency dependence of the FWM signal in the device can be subtracted, so the measurement errors of the polarization-mode dispersion can be significantly reduced.

In the set-up shown in FIG. 4, the measuring process comprises the steps of scanning the tunable filter 12 and the other tunable filter 6 to make sure that the intensity of the four-wave mixing beam $\omega_{2S}$ can be continuously monitored and recorded, which is equal to $\omega_2-(\omega_1-\omega_P)$, at an exit end of the SOA 5 when the tunable filter 12 is changed. The output of the filter 6 is fed via a detector 18 to a digital signal processor and analyzer 19, which analyzes the output of the SOA 5 and controls the switch 4 and the filter 6. After the measured FWM signal power of the beam $\omega_{2S}$ has been obtained as a function of the frequency of the beam $\omega_2$, the formula (7) can be used to calculate the mean PMD of the device under test. When the tunable filter 6 has been stopped at each value for the certain time period T, the high-speed 2×2 switch 4 is controlled with the speed V to obtain the VT/2-times average four-wave mixing intensities with and without the device under test. The frequency dependence of the FWM signal in the device under test can be subtracted, so that the measurement errors and accuracy of the polarization-mode dispersion in the DUT can be significantly reduced. The embedded software is important to the apparatus, because sophisticated software is required to individually control the various elements of the apparatus of FIG. 4. For example, when the tunable filter 12 values are changed, the tunable filter 6 must also be changed to achieve the corresponding values. Before the tunable filters are changed to other values, the 2×2 switch 4 must record the FWM signal power of the two situations many times with and without the device under test. All the test results and control are automatically processed using the digital signal processor (DSP) and a signal analyzer 19.

Figure 5:
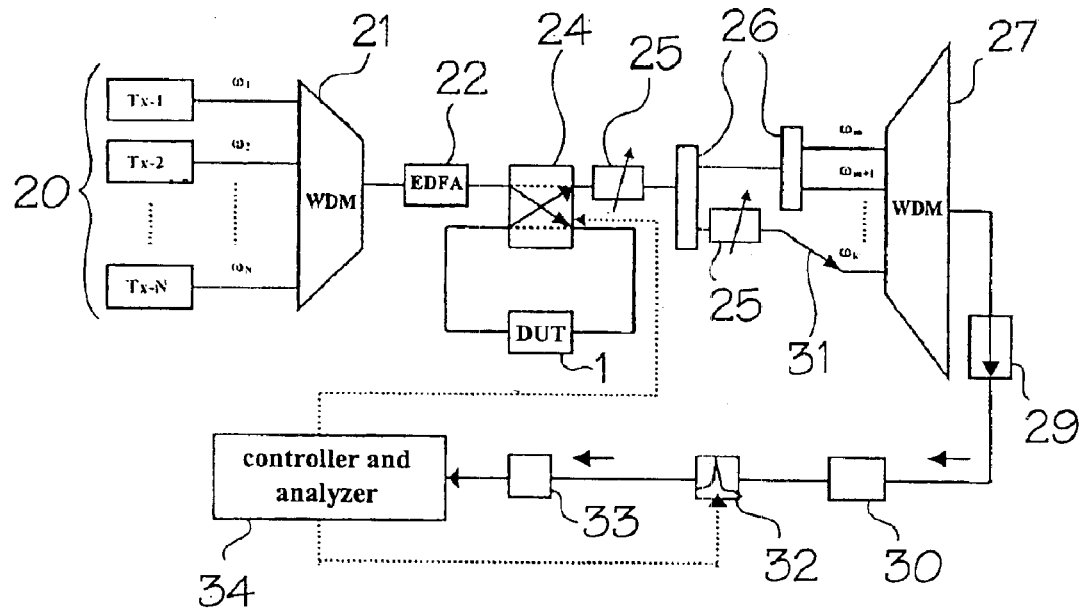
FIG. 5 is a block diagram showing a polarization-mode dispersion measuring apparatus of a dense wavelength-division multiplex (DWDM) transmission link in accordance with the present invention.
Figure 6:
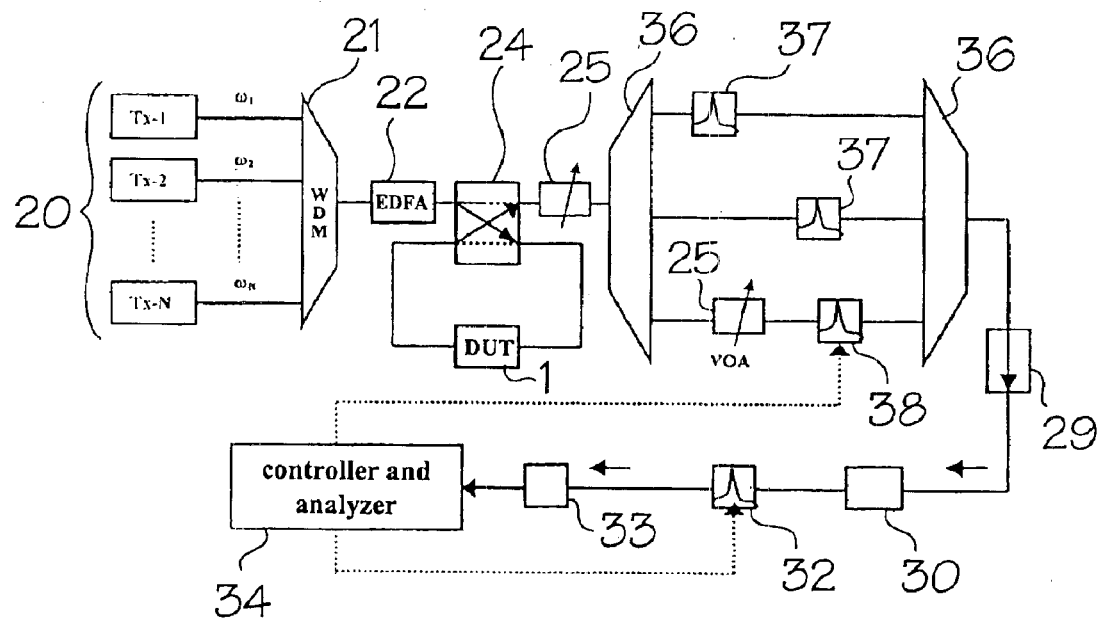
FIG. 6 is a block diagram of another polarization-mode dispersion measuring apparatus of a DWDM transmission link in accordance with the present invention.

Reference is made to FIGS. 5 and 6 which show two apparatuses for polarization-mode dispersion measurement of dense wavelength-division multiplexed (DWDM) networking systems. No any laser sources are required because DWDM transmitter laser sources 20 are used as PMD measurement laser sources, which significantly reduces the testing equipment cost and testing times as compared with current PMD measurement technology. The laser beams $\omega_1 \ldots \omega_n$ are fed through a wavelength-division multiplexer 21 and an erbium doped fiber amplifier (EDFA) 22 to high-speed 2×2 optical switch 24 to achieve the FWM intensities of interest with or without a DUT. The switch 24 is connected by two variable optical attenuators 25 and optical couplers 26 to a second multiplexer 27. The attenuators 25 control the expected power level of the first pump laser beam, the probe laser beam and the second pump beam before going through an isolator 29 to an semiconductor optical amplifier 30. The wavelengths of the first pump laser beam $\omega_m$ and the probe laser beam $\omega_{m+1}$ are fixed. The wavelength of the second pump laser beam $\omega_K$ is changeable from $\omega_1$ to $\omega_n$. But $\omega_k \neq \omega_m$ and $\omega_k \neq \omega_{m+1}$.

In the apparatus of FIG. 5, two 3-dB couplers 26, the 1×(N−2) optical switch 31 and a N×1 multiplexer 27 have been used to select signal $\omega_m$ as the first pump laser beam, $\omega_{m+1}$ as the probe laser beam and $\omega_k$ as the second pump laser beam, where k=1, 2, . . ., N, but k≠m and k≠m+1. The measuring process comprises the steps of scanning the tunable filter 32 to make sure that the intensity of the FWM ouput beam $\omega_{2S}$, which is equal to $\omega_k-(\omega_m-\omega_{m+1})$, at an exit end of the SOA 30, can be continuously monitored when the 1×(N−2) switch 31 is changed. After the measured FWM signal power of the beam $\omega_{2S}$ as a function of the frequency $\omega_k$ is obtained, the formula (7) is used to calculate the mean polarization-mode dispersion of the device 1. For each second pump laser beam $\omega_k$, the 1×(N−2) switch 50 and the tunable filter 32 can be stopped for time period T, and the high-speed and the 2×2 switch 24 can be controlled at speed V to obtain the VT/2-times average four-wave mixing intensities in the both cases with and without the device 1.

The apparatus of FIG. 6 includes two 1×3 optical couplers 36, two fixed filters 37 and a tunable filter 38 to select $\omega_m$ as the first pump laser beam, $\omega_{m+1}$ as the probe laser beam and $\omega_k$ as the second pump laser beam, where k =1, 2, . . . , N, but k≠m and k≠m+1. The measuring process includes the steps of scanning the tunable filter 38 to make sure that the intensity of the FWM output beam $\omega_{2S}$, which is equal to $\omega_k-(\omega_m-\omega_{m+1})$, at an exit end of the SOA 30, can be continuously monitored and recorded when the tunable filter $\omega_k$ has been changed. After the measured FWM signal power of the beam $\omega_{2S}$ as a function of the frequency $\omega_k$ is obtained, the formula (7) is used to calculate the mean dispersion of the device 1. For each second pump laser pump $\omega_k$ the tunable filter 32 is stopped for the certain time period T, and the high-speed 2×2 switch 4 is controlled at the speed V to obtain the VT/2-times average FWM intensities with and without the DUT. The frequency dependence of the four-wave mixing signal in the device 1 can be subtracted, so the measurement errors and accuracy of the dispersion in the device 1 can be significantly reduced.

Figure 7:
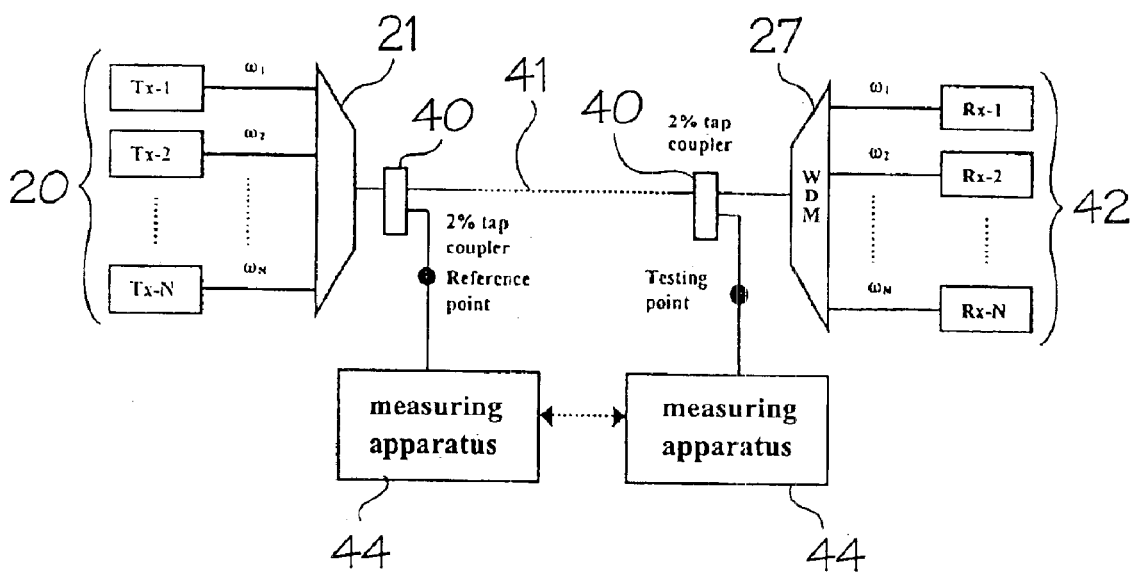
FIG. 7 is a block diagram showing an in-field polarization-mode dispersion measuring apparatus in accordance with the present invention in a running DWDM networking system.

Referring to FIG. 7, an in-field apparatus for measuring and monitoring polarization-mode dispersion in a span of optical fibers in a running DWDM networking system, using a BOP-FWM technique in a semiconductor optical amplifier and the optical transmitters of the networking systems, includes two tap couplers 40 connected by transmission links 41 to obtain the DWDM signals from transmitters 20 and 42 before and after the transmission links 41, respectively. The apparatus of FIG. 5 or 6, indicated generally at 44 can be used to obtain the intensity of the FWM output beam of interest before and after transmission links. The frequency dependence of the FWM signal in the transmission links 41 as a function of the frequency $\omega_k$, is subtracted, and the formula (7) is used to calculate the mean PMD of the transmission links 41. All the processing and data analyzing steps are controlled by the embedded software in a digital signal processor (DSP).

We claim:

1. A method of determining the polarization-mode dispersion in an optical device comprising the steps of:

generating a first pump laser beam with a fixed wavelength;

generating a probe laser beam with a second fixed wavelength and the same input polarization direction as said first pump laser beam;

generating a second pump laser beam having a variable wavelength and a polarization direction orthogonal to the first pump laser beam and the probe laser beam;

launching the first and second pump laser beams and said probe laser beam into an optical device to generate three output signals;

inputting the three output signals into a semiconductor optical amplifier to generate four-wave mixing products dependent upon the polarization-mode dispersion of the device; and computing the average polarization-mode dispersion of the device by measuring the power of the four-wave mixing versus the wavelength of the second pump laser beam.

2. The method of claim 1, wherein there is a fixed optical frequency difference between the first pump laser beam and the probe laser beam.

3. The method of claim 1, wherein said first pump laser, probe laser and second pump laser beams are passed through a polarization beam splitter before being launched into the optical device.

4. The method of claim 3, wherein said first pump laser, said probe laser and said second pump laser beams exiting said beam splitter are passed through an isolator to ensure unidirection travel of the beams.

5. The method of claim 4, wherein said first pump laser, said probe laser and said second pump laser beams are passed through a two-by-two switch before being launched into the optical device, and the output signals from the optical device are directed through the switch to the semiconductor optical amplifier.

6. An apparatus for determining the polarization-mode dispersion in an optical device comprising:

first laser means for generating a first pump laser beam with a fixed wavelength;

second probe laser means for generating a probe laser beam with a second fixed wavelength and the same input polarization direction as said first pump laser beam;

third laser means for generating a second pump laser beam having a variable wavelength and a polarization direction orthogonal to the first pump laser beam and the probe laser beam;

polarization beam splitter means for receiving said first pump, said probe and said second pump beams, and relaying said beams through an optical device under test to generate three output signals;

semiconductor optical amplifier means for receiving said output signals and generating four-wave mixing products dependent upon the polarization-mode dispersion of the device; and analyzer means for computing the polarization-mode dispersion of the device under test by measuring the power of the four-wave mixing products versus the wavelength of the second pump laser beam.

7. The apparatus of claim 6 including two-by-two switch means for connecting the optical device under test to said beam splitter means and said semiconductor optical amplifier means.

8. The apparatus of claim 7 including optical isolator means between said beam splitter means and said switch means for ensuring unidirectional operation of the apparatus.

9. The apparatus of claim 8 including a pair of interconnected fiber semiconductor ring cavity laser means incorporating said polarization beam splitter means: second semiconductor optical amplifier means in each said ring cavity laser means; and coupler means at the intersection of said rings for feeding beams from said ring cavity laser means to said first optical isolator means.

10. The apparatus of claim 9 including dual-wavelength filter means and tunable filter means in said ring cavity laser means; and polarization controller means and beam splitter means in each said ring cavity laser means for creating said first pump laser, said probe laser and said second pump laser beams.

* * * * *